(12) United States Patent
Jiang et al.

(10) Patent No.: US 11,113,412 B2
(45) Date of Patent: Sep. 7, 2021

(54) SYSTEM AND METHOD FOR MONITORING AND VERIFYING SOFTWARE BEHAVIOR

(71) Applicant: TONGJI UNIVERSITY, Shanghai (CN)

(72) Inventors: Changjun Jiang, Shanghai (CN); Hongzhong Chen, Shanghai (CN); Chungang Yan, Shanghai (CN); Zhijun Ding, Shanghai (CN); Wangyang Yu, Shanghai (CN); Junzhu Zhong, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 191 days.

(21) Appl. No.: 16/245,212

(22) Filed: Jan. 10, 2019

(65) Prior Publication Data
US 2019/0163925 A1    May 30, 2019

Related U.S. Application Data

(63) Continuation-in-part of application No. 14/441,115, filed as application No. PCT/CN2014/080494 on Jun. 23, 2014, now abandoned.

(30) Foreign Application Priority Data

Jan. 6, 2014    (CN) .......................... 201410014450.6

(51) Int. Cl.
*G06F 21/55* (2013.01)
*G06F 21/57* (2013.01)
(Continued)

(52) U.S. Cl.
CPC ......... *G06F 21/6218* (2013.01); *G06Q 20/38* (2013.01); *G06Q 20/3829* (2013.01);
(Continued)

(58) Field of Classification Search
None
See application file for complete search history.

(56) References Cited

U.S. PATENT DOCUMENTS

| 2008/0294556 A1* | 11/2008 | Anderson | ............... H04L 51/38 |
| | | | 705/44 |
| 2014/0171494 A1* | 6/2014 | Kolot | .................. A61K 38/164 |
| | | | 514/44 R |

OTHER PUBLICATIONS

Mouse Movement Behavioral Biometric Systems. Hamid. IEEE. (Year: 2011).*

(Continued)

*Primary Examiner* — Venkat Perungavoor
(74) *Attorney, Agent, or Firm* — Global IP Services; Tianhua Gu

(57) ABSTRACT

The present invention discloses a method and system configured for monitoring and verifying software behavior, comprising: receiving, by a software behavior verification system based on a physical hardware system, legal user behavior data containing user activities performed during legal electronic transactions and storing the legal user behavior data as a software behavior model; monitoring, by a software behavior monitor, data packets transmitted in a transaction, and sending data packets to the software behavior verification system; retrieving, by the behavior verification system, expected key sequences and information in the data packets; comparing the key sequences and information retrieved from the data packets with that of the software behavior model; if the key sequences and information retrieved from the data packets does not consistence with the software behavior model, it is determined that the transaction is an illegal electronic transactions, and the transaction is closed.

15 Claims, 6 Drawing Sheets

(51) Int. Cl.
  *G06F 21/62* (2013.01)
  *G06Q 20/38* (2012.01)
  *G06Q 20/40* (2012.01)
  *H04L 29/06* (2006.01)
  *G06F 21/54* (2013.01)

(52) U.S. Cl.
  CPC ........... *G06Q 20/40* (2013.01); *G06Q 20/405* (2013.01); *H04L 63/1416* (2013.01); *H04L 63/1425* (2013.01)

(56) References Cited

OTHER PUBLICATIONS

User Authentication Through Mouse Dynamics. Shen. IEEE. (Year: 2012).*
KR20090022682A. Min, Jang. (Year: 2009).*
Behavior-aware Trustworthiness Study of Networked Software. Fang. Atlantis Press. (Year: 2010).*

* cited by examiner

```
<place_node>
    <id>1</id>
    <num>1</num>
    <transition_list>
        <No>4</No>
    </transition_list>
</place_node>
```

Fig. 6

```
<transition_node>
    <id>5</id>
    <name>HandleIPN</name>
    <attri>merchant</attri>
    <outplace>
        <No>11</No>
        <No>12</No>
    </outplace>
    <inplace>
        <No>6</No>
        <No>8</No>
    </inplace>
    <input>
        <string>orderID</string>
        <string>gross</string>
        <string>status</string>
        <string>hidden</string>
        <string>merchantID</string>
        <string>caasID</string>
        <string>uniqueID</string>
    </input>
    <output>
        <string>http://10.60.149.180/Caas/servlet/Get_down?</string>
        <string>junzhu</string>
        <string>orderID</string>
        <string>merchantID</string>
        <string>caasID</string>
        <string>uniqueID</string>
    </output>
</transition_node>
```

Fig. 7

SYSTEM AND METHOD FOR MONITORING AND VERIFYING SOFTWARE BEHAVIOR

CROSS-REFERENCE

This is a continuation-in-part application based on a pending U.S. application Ser. No. 14/441,115, filed on May 6, 2015, which claims the priority to a Chinese application No. 201410014450.6, filed on Jan. 6, 2014, both of which are hereby incorporated by reference in their entireties, including any appendices or attachments thereof, for all purpose.

TECHNICAL FIELD

The present disclosure relates to system and method for monitoring and verifying software behavior.

BACKGROUND

In recent years, E-Commerce has become increasingly popular. Based on computer technology, communications technology, and network technology, E-Commerce uses methods such as electronic data exchange, emails, and electronic payment to implement electronic, digital, and network business of the whole commerce activities. Due to electronic transaction platforms, the whole procedures of sales, transaction, and confirmation are replaced by online transaction. Electronic Brokerage System (EBS) of the early bank transaction system of the first generation has developed to individual transaction platforms researched and developed by banks, and then to multi-subject transaction platforms provided by third parties and application program interfaces (APIs) demanded by the market. The development process of electronic transaction is rather rapid, but it also faces many opportunities and regulations.

The E-Commerce modes mainly include B2C, B2B, and C2C. However, these modes generally adopts third-party payment mode. Users, E-Commerce websites, and third-party payment platforms are three main subjects in the current electronic transaction process. The aforementioned three parties trust each other on the basis of technologies such as signature, verification, and encryption, and invoke interfaces from each other for communications, thereby cooperating to complete the whole online transaction process. However, since the current software development technology is imperfect, user client software, E-Commerce websites, and even third-party payment platforms may have communications interface vulnerabilities and logic errors.

The present invention faces the situation that malicious users who are legally registered often use these vulnerabilities to be engaged in illegal behaviors, and make illegal profits for themselves. Moreover, because the vulnerabilities are diversified and hard to detect and protect, user behavior is changeful, and network platforms are in a distributed structure and have loose coupling, conventional security methods cannot ensure the security of current electronic network transactions.

SUMMARY

An object of the present disclosure is to monitor and verify software behavior. The method for monitoring and verifying software behavior comprises receiving, by a software behavior verification system based on a physical hardware system, legal user behavior data containing user activities performed during legal electronic transactions and storing the legal user behavior data as a software behavior model; monitoring, by a software behavior monitor, data packets transmitted in a transaction, and sending data packets to the software behavior verification system; retrieving, by the behavior verification system, expected key sequences and information in the data packets; comparing, by the behavior verification system, the key sequences and information retrieved from the data packets with that of the software behavior model; if the key sequences and information retrieved from the data packets does not consistence with the software behavior model, it is determined that the transaction is an illegal electronic transactions, and the transaction is closed.

BRIEF DESCRIPTION OF THE DRAWINGS

To clarify the present disclosure, the accompanying drawings for the various embodiments are briefly described below.

FIG. 6 is a format (place_node) of a software behavior certificate.

FIG. 7 is a format (transition_node) of a software behavior certificate.

DETAILED DESCRIPTION OF THE PREFERRED EMBODIMENTS

Figure 1:
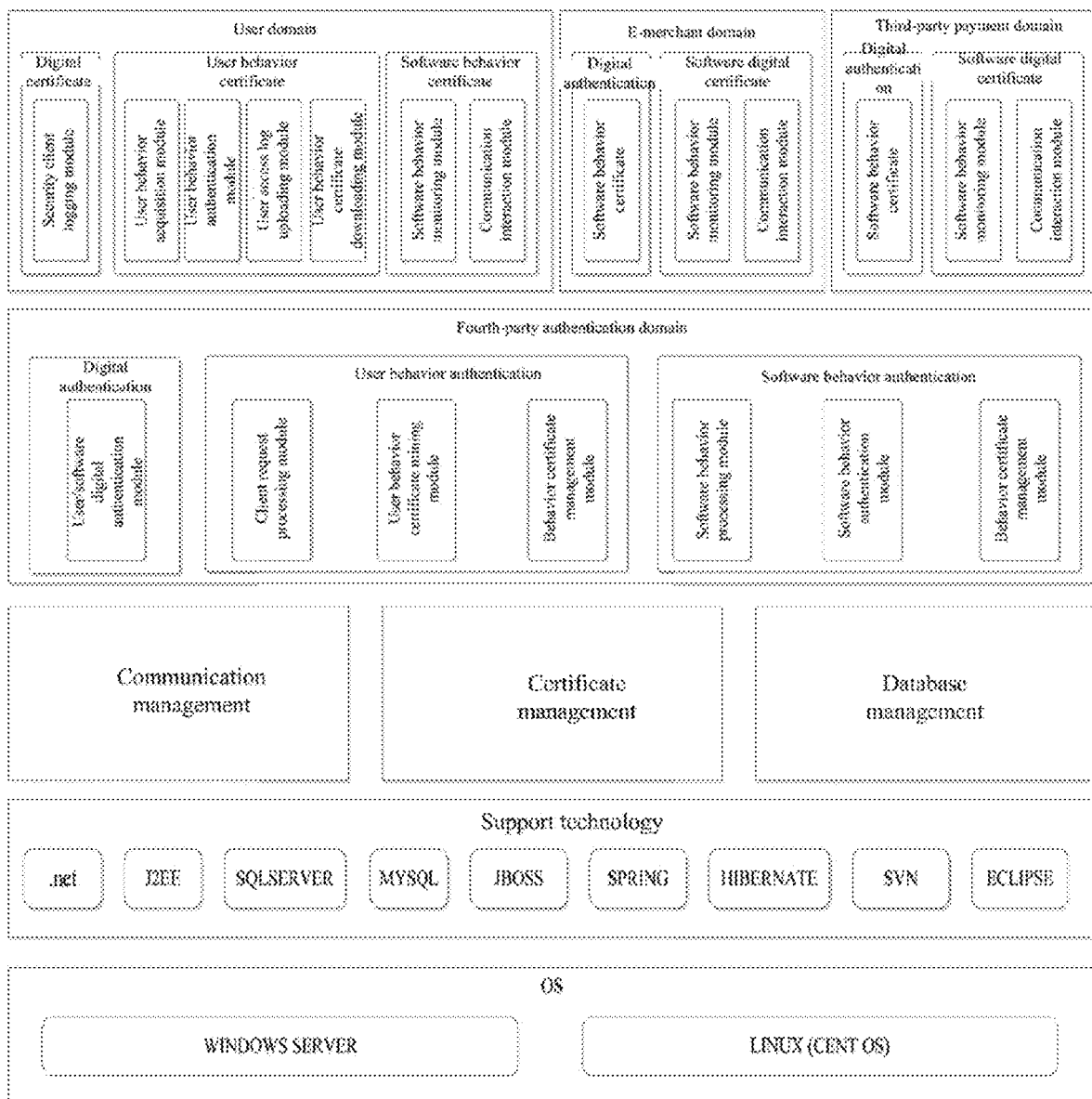
FIG. 1 illustrates a block diagram of system for monitoring and verifying software behavior.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

The application disclosure a system for monitoring and verifying software behavior, the system comprises: a software behavior monitor, configured for monitoring data packets transmitted in a transaction, and sending data packets to the software behavior verification system; a software behavior verification module, wherein the software behavior verification module comprises a software behavior model module, configured for receiving legal user behavior data containing user activities performed during legal electronic transactions based, and storing the legal user behavior data as a software behavior model, an information extracting module, configured for retrieving expected key sequences and information in the data packets, a comparing module, configure for comparing the key sequences and information retrieved from the data packets with that of the software behavior model, a warning module, configured for closing the transaction when the key sequences and information retrieved from the data packets does not consistence with the software behavior model.

FIG. 1 illustrates a block diagram of system for monitoring and verifying software behavior, according to one or more embodiments of the present disclosure. In FIG. 1, a bottom layer of the network transaction trustworthiness authentication system supports two mainstream operating systems, i.e., Windows and Linux, thus not only can be deployed on a Window system, but also can be deployed on a Linux system, and has very good cross-platform ability. Support technologies comprise .net, J2EE, SqlServer, MySql, JBoss, SPRING, HIBERNATE, etc., and provide a good support for application development of an upper layer.

A fourth-party authentication domain of the network transaction trustworthiness authentication system is above the basic management modules and mainly has functions of monitoring and authenticating a network transaction process, performing digital authentication to three transaction parties, verifying trustworthiness of user identity through the user behavior certificate and verifying trustworthiness of a network transaction behavior of the three transaction parties through the software behavior certificate. The fourth-party authentication domain is divided into three sub-parts i.e., the digital certificate, the user behavior certificate and the software behavior certificate to perform triple authentication to the network transaction process. Other three domains, i.e., a user domain, an E-merchant domain and a third-party payment domain of the network transaction monitoring and verifying system are above the fourth-party authentication domain. The user domain is mainly responsible for uploading the user digital certificate, verifying the user identity through the user behavior certificate as well as acquiring and uploading a client software behavior in the transaction process. The E-merchant domain and the third-party payment domain mainly have functions of uploading digital certificates thereof, as well as acquiring and uploading software behaviors.

The user domain, the E-merchant domain and the third-party payment domain each has a software behavior monitor, the software behavior monitor monitors data packets transmitted in a transaction, and sending data packets to the software behavior verification system. The type of the monitor is not limited herein.

The entire system is deployed to the apache server, which is available on each operating system. The monitoring system emphasizes the real-time of the data, and the purpose of providing real-time data call service from the bottom layer to the upper layer is to provide the data from the middle layer to the upper layer. When the data come from a third party system instead of a local database, this part of the service will have the ability to access both external and internal data sources.

In some embodiments, the behavior verifying module may be accessed by the users, the E-commerce platform, and the third party payment platform which participate in electronic transactions such as online shopping or secure banking transactions. The behavior verifying module may monitor these parties' behaviors during such electronic transactions. Examples of monitored behaviors may include electronic/online user actions/activities such as data inputting (e.g., inputting user names and passwords), web-page accessing (e.g., accessing specific secured web sites), web-browsing patterns, payment transactions, data updating actions (e.g., updating personal credentials), etc. The behavior verifying module may collect these monitored user behaviors, and compares these behaviors with the behaviors in the software behavior model.

Figure 2:
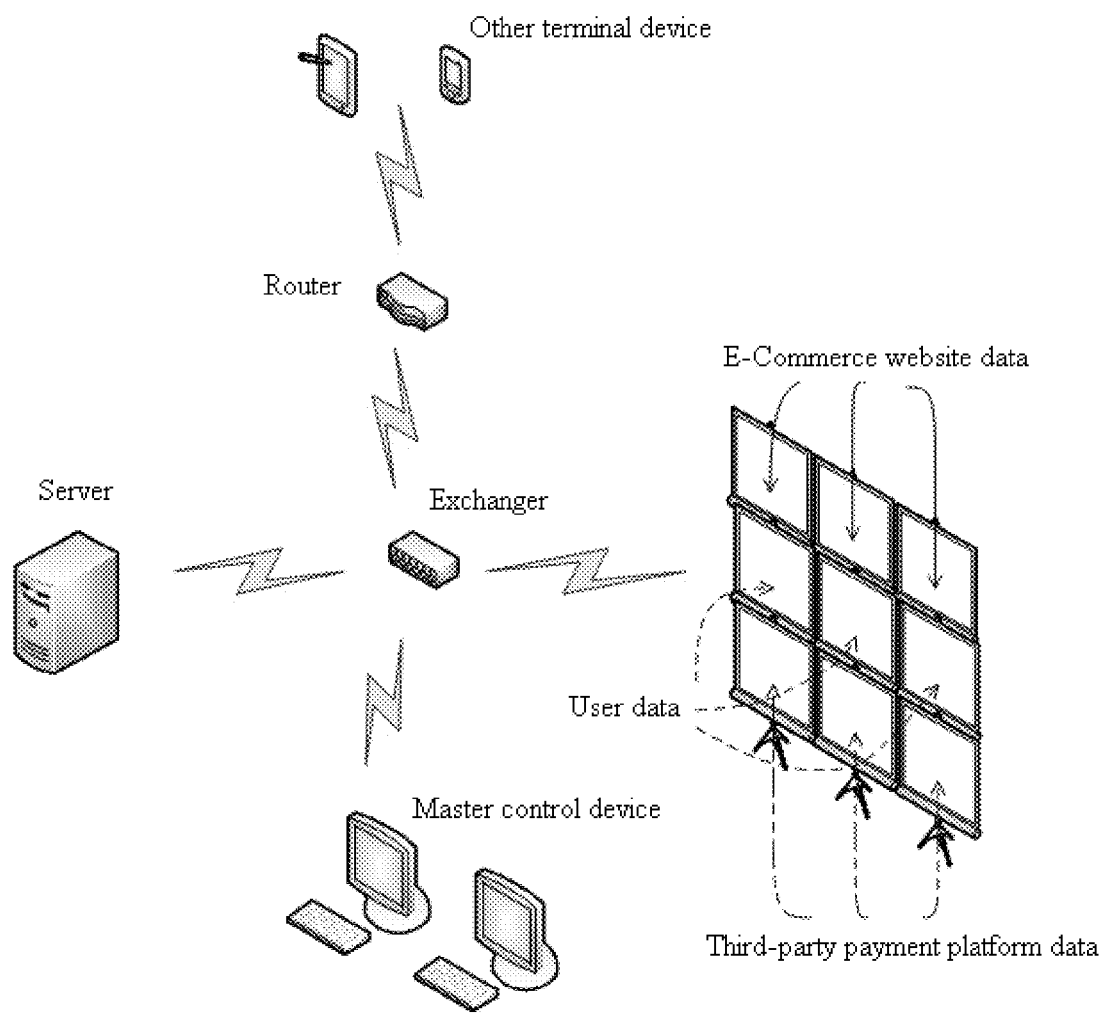
FIG. 2 illustrates an architecture diagram of system for monitoring and verifying software behavior.
Figure 3:
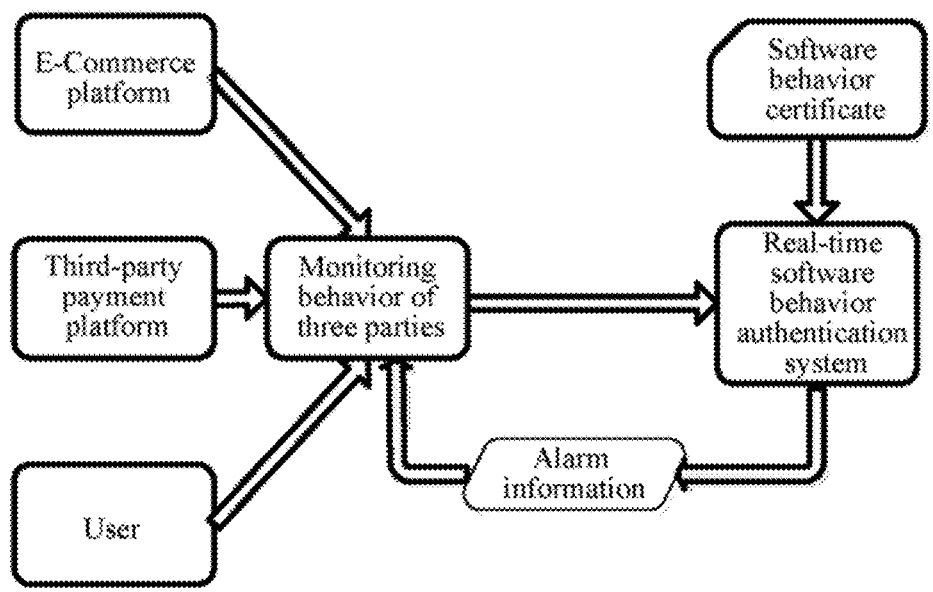
FIG. 3 is an architecture diagram of software behavior monitoring and verification.

FIG. 2 illustrates an architecture diagram of system for monitoring and verifying software behavior.

The user data, the E-commerce website data, and the third party payment platform data which indicates behaviors of corresponding client is displayed on the monitoring data visualization platform. These data is obtained from the monitored external e-commerce platform through real-time data services. The visualization platform highlights the abnormal transaction, so that business personnel can discover and analyze abnormal transactions.

It should be recognized that the various terms, layers and categorizations used to describe the components in FIG. 1 and FIG. 2 may be referred to differently without departing from their functionalities or the spirit and scope of the present disclosure. For example, the software behavior monitor and the behavior verifying module may be located in the same physical hardware system, or the behavior verifying module may be located in another independent physical hardware system except for the user client, the E-commerce website and the third party payment platform.

In some embodiments, the physical hardware system may be configured with, without limitation, a Central Processing Unit (CPU), memory, a Network Interface Card (NIC), and/or additional electronic circuit components not shown in FIG. 1. The CPU may be a general-purpose or specialized computing processor having electronic circuitry to perform arithmetical, logical, and input/output operations for the physical hardware system. The CPU may be configured to supply functionalities of the training and evaluation controller as well as modules. The CPU may also be configured to utilize the physical memory to store or retrieve immunity-related data. The memory may be hardware storage devices having integrated circuits for storing information used in the behavior evaluation system. The memory may be volatile memory (e.g., dynamic random-access memory (DRAM) or CPU cache memory) and non-volatile memory (e.g., hard drive or flash memory). In some embodiments, the memory may be non-transitory computer-readable storage medium, containing a set of instructions which, when executed by the CPU, cause the CPU to perform a method of behavior evaluation. The NIC may be network communication hardware for transmitting messages among the various components (e.g., the training and evaluation controller and the modules) within, or delivering messages in and out of, the behavior evaluation system. In some embodiments, the behavior evaluation system may be implemented in a distributed virtualized environment (e.g., using virtualization applications such as VMWARE® vCenter).

The whole software behavior monitoring and verification system stores behavior of real authorized users and uses the behavior to form a software behavior certificate, and performs real-time comparison and one-step verification on the three-party interaction behavior sequence and the software behavior certificate in the transaction process mainly according to a global unique order number; once any party has illegal behavior such as disorder of messages or identity spoofing, an alarm is sent or certain measures are taken. The three-party software behavior monitor: a data packet monitor installed on an E-Commerce website, a third-party payment platform, and a user client, and used to monitor, in real time, data packets transmitted between the three parties in a complete transaction, and extract and integrate necessary parameter information in the data packets, so as to send key information to the real-time software behavior verification system. The monitor is technically based on jpcap, and mainly captures HTTP data packets, and extracts URL addresses and parameter information in the data packets, a serial number of the E-Commerce website, and a serial number of the third-party payment platform in the three parties of the transaction. Subsequently, the monitor establishes a socket connection with the real-time software behavior verification system, and sends the key information to the real-time software behavior verification system by using a TCP data packet.

Figure 4:
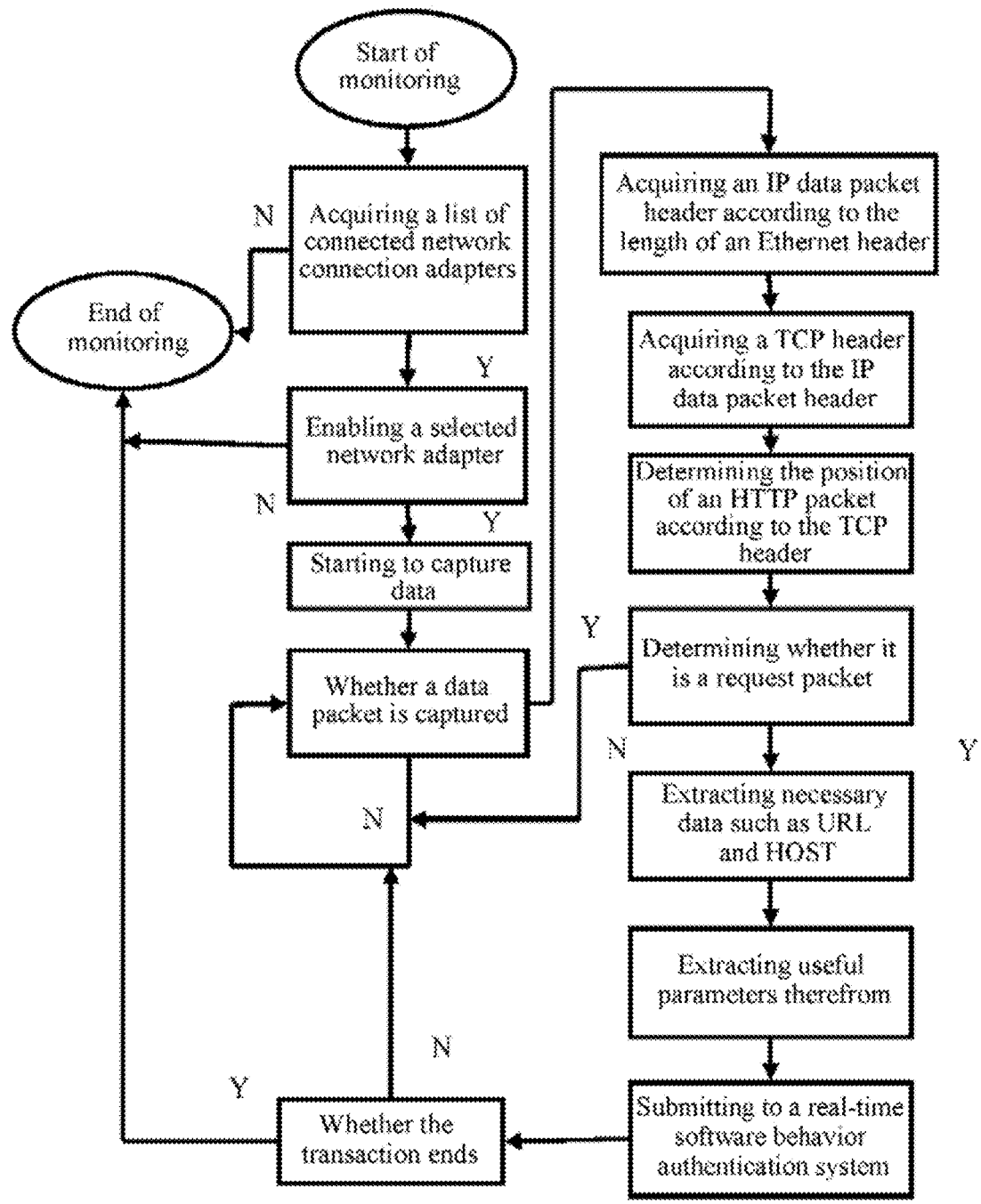
FIG. 4 is a flowchart of a three-party software behavior monitor.
Figure 5:
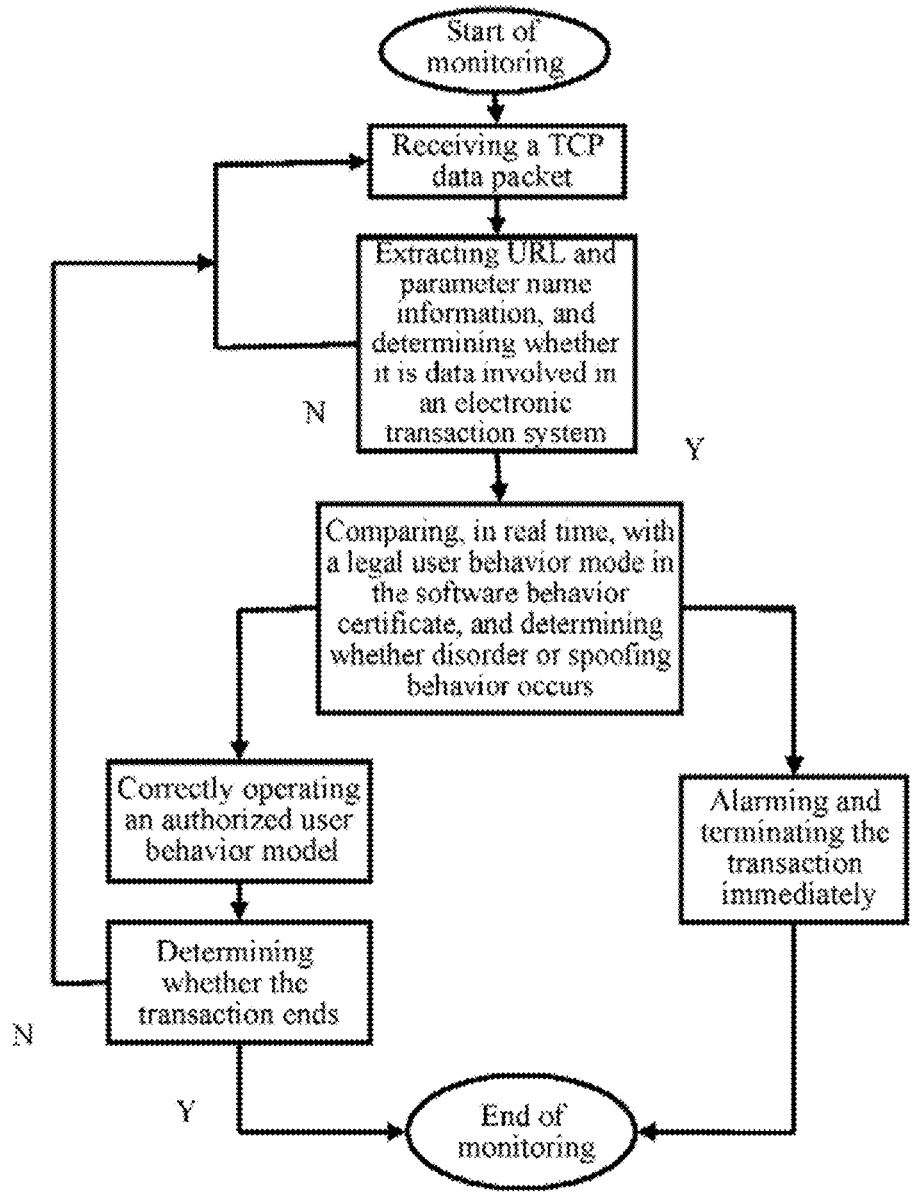
FIG. 5 is a flowchart of a real-time software behavior verification system.

The three-party software behavior monitoring process is shown in FIG. 4;

the real-time software behavior verification system: after establishing a socket connection with the three-party software behavior monitor, the real-time software behavior verification system receives the TCP data packet sent by the three-party software behavior monitor, and extracts and integrates the key sequence and information in the data packets. Then, the real-time software behavior verification system authenticates a user behavior interaction sequence against the software behavior model in real time according to a global unique order number, and sends an alarm and terminates the transaction in the case of illegal behaviors such as disorder and identity spoofing. FIG. 5 is a flowchart of the real-time software behavior verification system:

the software behavior certificate is formed according to interaction modes between the three parties, that is, the E-Commerce website, the third-party payment platform, and the user client, comprising the interaction modes between any two of them; the software behavior certificate is manually created by a professional, and is stored in a server in the format of an XML file.

The format of the software behavior certificate is shown in FIG. 6 and FIG. 7:

input is a key parameter (URL and the like) received by any of the three parties (user, E-Commerce website, and third-party payment platform); and output is a key parameter sent by the current party; the interaction information represents a software behavior sequence.

The software behavior defined in the software behavior certificate has certain behavior logic, which represents the interaction sequence of the three parties, premise conditions, and the like. Each transition_node in the software behavior certificate is a behavior node; the data packets captured by any of the three parties are grouped into two categories: received message and sent message, which respectively correspond to input and output in the transition_node; the received message and the sent message need to meet such a logical sequence that the received message is prior to the sent message; and the captured behavior sequence is compared with the corresponding transition_node; and once the logical sequence is not met, an alarm is sent. Meanwhile, the real-time software behavior verification system further compares a current subject of the received message or the sent message with a subject name recorded by an attribute attri in the certificate behavior node (transition_node); and if they are inconsistent, it indicates that an unauthorized user performs an identity spoofing attack, and an alarm is sent immediately. A place_node defines a logical sequence between behavior nodes, and the behavior nodes (transition_node) are arranged according to a particular transaction sequence; and once a skip or disorder occurs, it indicates that the legal normal transaction process is broken and an irregular operation occurs, and an alarm sent immediately.

The present application further provided a method for monitoring and verifying software behavior. The method comprises: receiving, by a software behavior verification system based on a physical hardware system, legal user behavior data containing user activities performed during legal electronic transactions and storing the legal user behavior data as a software behavior model; monitoring, by a software behavior monitor, data packets transmitted in a transaction, and sending data packets to the software behavior verification system; retrieving, by the behavior verification system, expected key sequences and information in the data packets; comparing ,by the behavior verification system, the key sequences and information retrieved from the data packets with that of the software behavior model; if the key sequences and information retrieved from the data packets does not consistence with the software behavior model, it is determined that the transaction is an illegal electronic transactions, and the transaction is closed.

The software behavior certificate is formed by a professional according to three-party communications data packets in a correct transaction process among a user, an E-Commerce website, and a third-party payment platform to define normal legal interaction behavior of the three parties, and the software behavior certificate is a software behavior model formed corresponding to interaction modes between the E-Commerce website, the third-party payment platform, and a user client.

The three-party software behavior monitor is a data packet monitor installed on the E-Commerce website, the third-party payment platform and the user client, and is used to monitor, in real time, data packets transmitted between the three parties in a complete transaction, and extract and integrate necessary parameter information (comprising a URL address and a parameter and the like) in the data packets, so as to send key information to the real-time software behavior verification system. The three-party software behavior monitor is technically based on jpcap, and mainly captures HTTP data packets, and extracts URL addresses and parameter information in the data packets, a serial number of the E-Commerce and a serial number of the third-party payment platform in the three parties of the transaction, and then establishes a socket connection with the real-time software behavior verification system, and sends the key information to the real-time software behavior verification system by using a TCP data packet.

After receiving data packets of interaction information in the transaction that are respectively submitted by the three-party software behavior monitor, the real-time software behavior verification system extracts and integrates key sequences and information in the data packets, and compares a user behavior interaction sequence with the software behavior model in real time according to a global unique order number, and sends an alarm and terminates the transaction in the case of illegal behaviors comprising disorder and identity spoofing.

The present application further provided a non-transitory computer-readable storage medium. The non-transitory computer-readable storage medium contains a set of instructions which, when executed by a processor, cause the processor to perform a method for monitoring and verifying software behavior, the method comprising: receiving, by a software behavior verification system based on a physical hardware system, legal user behavior data containing user activities performed during legal electronic transactions and storing the legal user behavior data as a software behavior model; monitoring, by a software behavior monitor, data packets transmitted in a transaction, and sending data packets to the software behavior verification system; retrieving, by the behavior verification system, expected key sequences and information in the data packets; comparing, by the behavior verification system, the key sequences and information retrieved from the data packets with that of the software behavior model; if the key sequences and information retrieved from the data packets does not consistence with the software behavior model, it is determined that the transaction is an illegal electronic transactions, and the transaction is closed.

The software behavior model comprises behaviors of an E-Commerce website, a third-party payment platform, and a user client, and interaction modes between two of the above three terms.

Systems and methods for monitoring and verifying software behavior have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for monitoring and verifying software behavior, comprising:

the method is executed by a processor;

receiving, by a software behavior verification system based on a physical hardware system, legal user behavior data containing user activities performed during legal electronic transactions and storing the legal user behavior data as a software behavior model;

monitoring, by a software behavior monitor, data packets transmitted in a transaction, and sending data packets to the software behavior verification system;

retrieving, by the behavior verification system, expected key sequences and information in the data packets;

comparing, by the behavior verification system, the key sequences and information retrieved from the data packets with that of the software behavior model;

if the key sequences and information retrieved from the data packets does not consistence with the software behavior model, it is determined that the transaction is an illegal electronic transactions, and the transaction is closed;

the software behavior in the software behavior model has behavior logic;

the software behavior in the software behavior model has behavior nodes, wherein the behavior nodes are arranged according to a transaction sequence.

2. The method for monitoring and verifying software behavior according to claim 1, the software behavior model comprises behaviors of an E-Commerce website, a third-party payment platform, and a user client, and interaction modes between two of the above three terms.

3. The method for monitoring and verifying software behavior according to claim 1, the data packets comprises URL address, a serial number of the E-Commerce website and a serial number of the third-party payment platform.

4. The method for monitoring and verifying software behavior according to claim 1, the user receiving message prior to sending message.

5. The method for monitoring and verifying software behavior according to claim 3, the data packets further comprises a subject name.

6. The method for monitoring and verifying software behavior according to claim 1, the software behavior monitor is based on jpcap.

7. The method for monitoring and verifying software behavior according to claim 1, the software behavior monitor has a socket connection with the behavior verification system.

8. A system for monitoring and verifying software behavior comprising:
a memory, and a processor in communication with the memory;
a software behavior monitor, monitoring data packets transmitted in a transaction, and sending data packets to the software behavior verification system;
a software behavior verification module, wherein the software behavior verification module comprises a software behavior model module, receiving legal user behavior data containing user activities performed during legal electronic transactions based, and storing the legal user behavior data as a software behavior model, an information extracting module, retrieving expected key sequences and information in the data packets, a comparing module, configure for comparing the key sequences and information retrieved from the data packets with that of the software behavior model, a warning module, closing the transaction when the key sequences and information retrieved from the data packets does not consistence with the software behavior model;
the software behavior in the software behavior model has behavior logic;
the software behavior in the software behavior model has behavior nodes, wherein the behavior nodes are arranged according to a transaction sequence.

9. The system for monitoring and verifying software behavior according to claim 8, the software behavior model comprises behaviors of an E-Commerce website, a third-party payment platform, and a user client, and interaction modes between two of the above three terms.

10. The system for monitoring and verifying software behavior according to claim 8, the data packets comprises URL address, a serial number of the E-Commerce website and a serial number of the third-party payment platform.

11. The system for monitoring and verifying software behavior according to claim 8, the user receiving message prior to sending message.

12. The system for monitoring and verifying software behavior according to claim 10, the data packets further comprises a subject name.

13. The system for monitoring and verifying software behavior according to claim 8, the software behavior monitor is based on jpcap.

14. The system for monitoring and verifying software behavior according to claim 10, the software behavior monitor has a socket connection with the behavior verification system.

15. A non-transitory computer-readable storage medium, containing a set of instructions which, when executed by a processor, cause the processor to perform a method for monitoring and verifying software behavior, the method comprising:
the method is executed by a processor;
receiving, by a software behavior verification system based on a physical hardware system, legal user behavior data containing user activities performed during legal electronic transactions and storing the legal user behavior data as a software behavior model;
monitoring, by a software behavior monitor, data packets transmitted in a transaction, and sending data packets to the software behavior verification system;
retrieving, by the behavior verification system, expected key sequences and information in the data packets;
comparing, by the behavior verification system, the key sequences and information retrieved from the data packets with that of the software behavior model;
if the key sequences and information retrieved from the data packets does not consistence with the software behavior model, it is determined that the transaction is an illegal electronic transactions, and the transaction is closed;
the software behavior in the software behavior model has behavior logic;
the software behavior in the software behavior model has behavior nodes, wherein the behavior nodes are arranged according to a transaction sequence.

\* \* \* \* \*